Patented Jan. 23, 1945

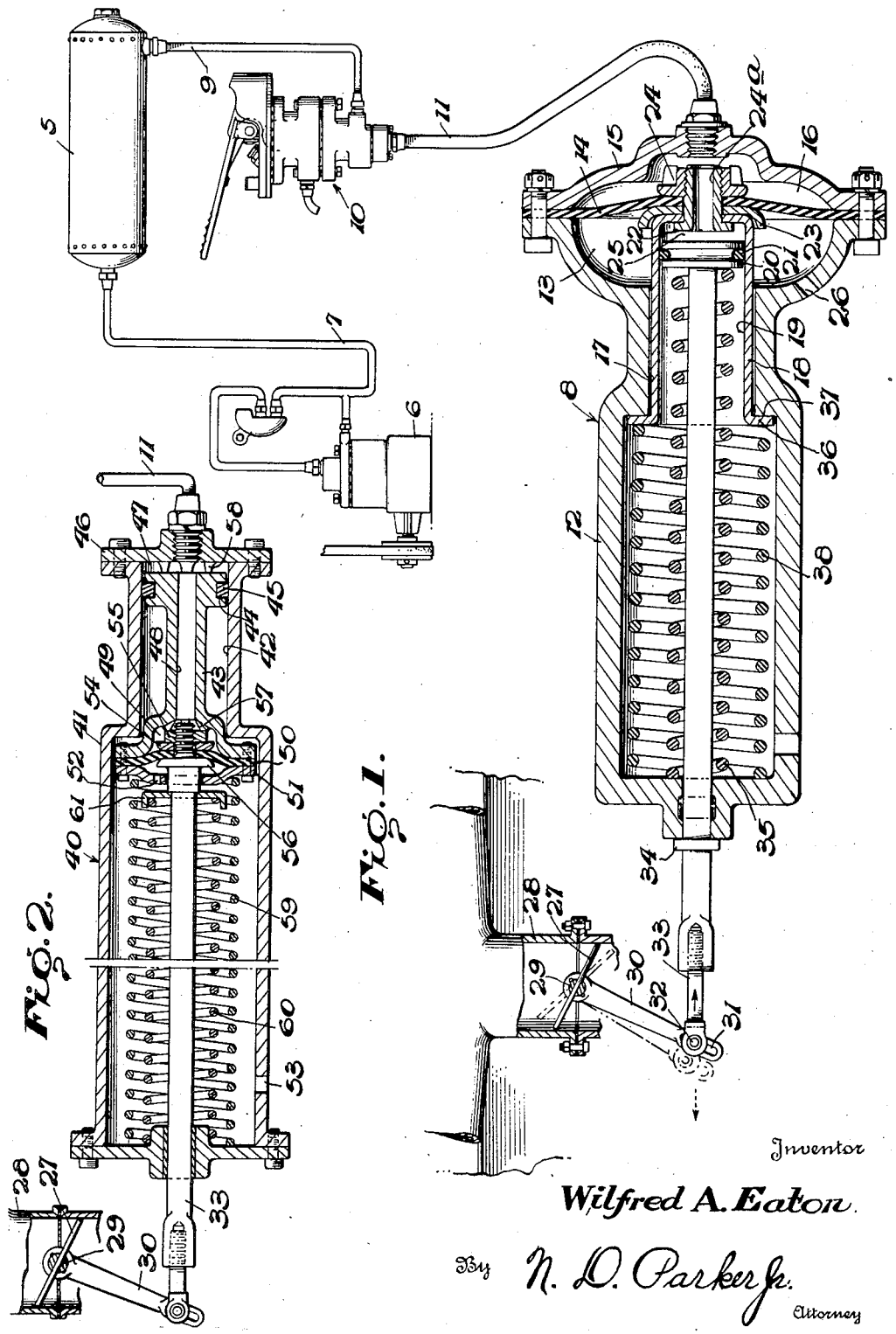

2,367,852

UNITED STATES PATENT OFFICE 2,367,852

FLUID PRESSURE DEVICE

Wilfred A. Eaton, Elyria, Ohio, assignor to Bendix-Westinghouse Automotive Air Brake Company, Elyria, Ohio, a corporation of Delaware Application October 9, 1941, Serial No. 414,350

11 Claims. (Cl. 121—38)

This invention relates to control mechanisms and more particularly to remotely controlled fluid pressure operated mechanisms especially adaptable for use in connection with the control of throttle valves on motor vehicle engines.

It has heretofore been proposed to employ fluid motors of the type having cylinders and pistons for actuating such throttle valves by fluid pressure, but due to the inherent friction between the piston and the cylinder walls, considerable difficulty has been experienced in obtaining smooth and satisfactory control.

It is accordingly an object of the present invention to provide a fluid motor for actuating such mechanisms so constituted as to avoid the above disadvantages.

Another object of the invention is to provide in a fluid motor of the above type, an arrangement for providing smooth and efficient action throughout the entire range of operation.

Yet another object of the invention is to provide, in a fluid motor of the above type, a plurality of pressure responsive devices together with a construction for controlling the operation of these devices during the full range of operation thereof.

These and other novel objects and features of the invention will become more readily apparent when considered in the light of the drawing and the following description.

In order that those skilled in the art may more fully understand the nature of the present invention and its application to vehicle controlling members, and particularly to the control of vehicle engine throttle valves, two modifications have been set forth hereinafter by the way of description and exemplification in the accompanying drawing. It is to be expressly understood, however, that the drawing is employed for purposes of illustration only, and is not designed as a definition of the limits of the invention, reference being had for this purpose to the appended claims.

In the drawing, wherein similar reference characters refer to similar parts throughout the several views;

Fig. 1 is a diagrammatic view, partially in section of a control mechanism constructed in accordance with the principles of the present invention, and Fig. 2 is an axial sectional view of a modified form of a fluid motor adapted to be employed in the system illustrated in Fig. 1.

Referring more particularly to Fig. 1, the system illustrated includes a source of fluid pressure or reservoir 5 adapted to be supplied with fluid pressure from a suitably driven compressor 6, through the medium of a connecting conduit 7, fluid pressure from the reservoir 5 being supplied under the control of the operator to a fluid motor, generally designated as 8, through the medium of a conduit 9, a control valve 10, and a conduit 11 leading therefrom to the fluid motor.

Fluid motor 8 is provided with a casing 12 having an enlarged cavity 13 formed at its right end, this cavity being closed by means of a pressure responsive diaphragm 14 clamped to the end of the casing 12 in sealing engagement therewith by means of a cover plate 15, a cavity 16 formed in the cover plate receiving fluid pressure from the conduit 11. The casing 12 is provided with a cylindrical bore 17 in which is slidably mounted a hollow cylinder 18, this cylinder likewise being provided with a cylindrical bore 19 adapted to slidably receive a piston 20 maintained in sealing engagement with the wall of the cylinder by means of a sealing ring 21 carried thereby. For purposes to be described hereinafter, the right end of the cylinder 18 is attached to the center of the diaphragm 14 by means of clamping bolt 22, washer 23 and nut 24, the bolt 22 being provided with a port 24a in the center thereof for permitting the flow of fluid pressure between the chamber 16 and a chamber 25 defined by the cylinder 18 and the piston 20. In addition to the above, an atmospheric port 26 is provided in the wall of the cavity 13, in order that the cavity may at all times be maintained at atmospheric pressure.

An engine throttle valve 27 is pivotally mounted in an intake manifold 28 of a vehicle engine, diagrammatically indicated, by means of a shaft 29, actuation of said shaft and throttle valve being accomplished by means of a lever 30 attached to the shaft 29 and adapted for rotation therewith. The lower end of the lever 30 is provided with a slot 31 adapted to receive a pivot pin 32 carried by a connecting rod 33, the connecting rod having its right end firmly attached to the piston 20 for movement therewith. As shown in the drawing, the rod 33 is divided into two parts which are threadedly connected for the purpose of adjusting the position of the throttle lever when the rod is in retracted position. The movement of the rod 33 to the right is also limited by means of a collar 34 formed thereon and adapted to engage the left end of the casing 12 for purposes to be described hereinafter.

In order that the rod 33 may ordinarily be maintained in the position shown with the throttle valve in closed position with the collar 34 against the left end of the casing, a spring 35 is interposed between the end of the casing and the left side of the piston 20, while the left end of the cylinder 18 is provided with a flanged portion 36 adapted to normally abut a shoulder 37 formed at the right end of the interior of the casing, and the cylinder is normally maintained in this position by means of an additional spring 38 interposed therebetween and the left end of the casing.

In the operation of pistons of the type above described, the valve 10 is normally set to graduate the pressure in the fluid motor over a range of from 0 to about 60 pounds, for example, and this being the case, the tension of the outer spring 38 is so chosen as to permit movement of the pressure responsive diaphragm 14 and its attached cylinder 18 from one extreme of movement to the other during this change in pressure, the washer 23 acting in connection with the wall of the cavity 13 as a stop to prevent movement of the diaphragm beyond this point. The cylinder 18 and the piston 20 are so designed, however, as to provide for a longer travel of the piston with relation to the cylinder than that which occurs in the case of the diaphragm, and the inner spring 35 is accordingly so chosen as to permit the piston 20, on the application of a pressure of about 60 pounds to the fluid motor, to move sufficiently to the left to open the throttle valve to its wide open position. In view of the fact that the areas of the piston 20 and the diaphragm 14 are widely divergent, it will also be readily understood that the springs must be so chosen with respect to the corresponding areas as to permit the proper travel of the pressure responsive members to occur during the above pressure range. The springs 35 and 38 are preferably not pre-loaded but become effective to oppose movement of the piston and cylinder respectively as soon as motion of these parts occurs.

It will be understood from the foregoing description that the piston and the diaphragms have what may be called a differential movement on the application of fluid pressure to the fluid motor, the diaphragm moving a relatively small distance in response to each increment of pressure applied thereto and the piston moving a greater distance in response to corresponding increments of pressure.

In the operation of this device to control the degree of opening of the throttle valve, a small increment of pressure may be supplied to the chamber 16, for example, whereupon the diaphragm will tend to move through a given small distance and the piston will tend to move through a greater distance with respect to the casing, and through a distance equal to the difference between the two above distances with respect to the diaphragm. In view of the inherent frictional characteristics of sealing members such as the sealing member 21 used to prevent leakage between the cylinder wall and the piston, however, the application of a small amount of pressure to the chamber 16 may be insufficient to cause movement of the piston 20 with respect to the cylinder 18, but the diaphragm 14 and the cylinder 18 attached thereto will necessarily move under this condition, since the inherent friction of the diaphragm as well as the friction between the outside of the cylinder 18 and the wall of the bore 17 can be made so small as to be negligible. Consequently, any increase in pressure in the chamber 16 will cause a certain amount of movement of the piston and cylinder assembly, and therefore, of the rod 33, the pressure in the chamber 25 of the cylinder tending at the same time to build up to a point sufficient to overcome the friction of the sealing ring 21 and to move the piston with relation to the cylinder 18. It will accordingly be understood that initial movement of the rod 33 in response to an increase in pressure in the chamber 16 and in the chamber 25 will be the result of movement of the diaphragm 14 against the spring 38, which movement is imparted to the rod 33 by means of the frictional connection between the cylinder 18 and the piston 20, a further increase of pressure in the chamber 16 and in the chamber 25 tending to cause actual movement of the piston itself with relation to its cylinder, whereupon the springs acting on the piston and on the cylinder, having been so chosen as to be proportional to the areas of the respective pressure responsive members, act to again normalize the respective positions of the pressure responsive members with respect to the pressures applied thereto so that uniform operation of the connecting rod with respect to the pressure supplied to the pressure responsive members may be obtained throughout the entire range of movement thereof.

In Fig. 2 of the drawing a slightly different embodiment of the invention is illustrated. Therein the fluid motor 40 is provided with a casing 41 having a bore 42 formed at its right end adapted to slidably receive a piston member 43. The piston member 43 is provided with a groove 44 having a sealing ring 45 mounted therein for preventing leakage of fluid pressure between the outer surface of the piston and the wall of the bore 42.

In connection with a cover plate 46, the piston forms a piston chamber 47 in communication at all times with the conduit 11, and the piston is further provided with a central bore 48 adapted to maintain communication at all times between the chamber 47 and a diaphragm chamber 49 formed at the left end of the piston and closed by means of a diaphragm 50 suitably clamped to the piston by means of a piston cover plate 51, as shown. The left end of the cover plate is provided with a port 52 for subjecting the left side of the diaphragm to the pressure within the casing 41 at all times, and the interior of the casing 41 is connected to atmosphere by means of a port 53. The right end of the connecting rod 33 is connected to the center of the diaphragm by means of washer 54, nut 55 and a shoulder 56 formed on the rod, the left side of the shoulder likewise being adapted to engage the right side of the cover plate 51 to prevent undue distortion of the diaphragm under certain operating conditions to be more thoroughly described hereinafter. In like manner excessive movement of the diaphragm to the right with relation to the piston 43 is prevented by engagement of the nut 55 with suitable stops 57 formed on the left end of the piston body. The piston body is normally maintained in the position shown against stops 58 provided on the cover plate by means of a spring 59 interposed between the casing and the piston cover plate 51, while the connecting rod 33 is maintained with the nut 55 against the stops 57 by means of a spring 60 interposed between the casing and a spring seat 61 carried by the connecting rod. It is further noted that the connecting rod 33 is comprised of two parts threadedly secured to each other in order to permit proper adjustment of the position of the throttle valve for idling of the motor when the parts are in the positions shown.

In the form of the invention illustrated in Fig. 2, the effective area of the diaphragm 50 is preferably so chosen as to be the same as the effective area of the piston 43, so that on admission of fluid pressure to chamber 47 through conduit 11 from control valve 10, Fig. 1, the force acting on the piston and on the diaphragm due to this pressure will be substantially the same. Both the springs 59 and 60 are preferably mounted without appreciable tension in the positions shown, but are adapted to be picked up by the piston and by the rod 33 immediately on movement thereof. On admission of fluid pressure to the chamber 47, this pressure is also transmitted to the chamber 49 to act on the diaphragm 50 through the passage 48, with the result that sticking of the piston 43 due to the friction between the sealing ring 45 and the cylinder wall will in no way effect the operation of the diaphragm 50, the friction of the diaphragm and its attached parts being so slight as to permit immediate movement thereof, and corresponding actuation of the throttle valve in response to any increase in pressure in chamber 49. In the meantime the same pressure acting in the chamber 47 tends to overcome the friction of the piston against the cylinder wall, so that the piston will eventually break loose and move to follow the motion of the connecting rod and diaphragm. As the pressure is further increased in the chamber 47 the same cycle of operation will be repeated and if the tensions of the springs 59 and 60 are properly chosen, this action will be effective throughout the entire range of movement of the connecting rod. Likewise on release of fluid pressure from the chamber 47, the diaphragm will be effective to permit movement of the connecting rod in reverse direction under the action of spring 60 regardless of any possible sticking which may occur between the sealing ring 45 and the cylinder 42, so that a relatively smooth controlling operation of the throttle will be obtained under all normal conditions of operation. It will also be understood that the pick-up of the spring 59 is so chosen as to permit the full stroke of the piston to occur over the range of fluid pressures for which the control valve of the system is set, while the spring 60 will be so chosen as to permit the full travel of the diaphragm 51 and of the push rod 35 with respect to the piston over the same range of pressure. It is also noted that any jerk of the piston as the friction between the sealing ring 45 and the cylinder wall is overcome, will tend to be absorbed by the flexible connection existing between the connecting rod and the piston body instead of being imparted to the rod, this flexible connection, of course being the diaphragm 50.

It will be seen from the foregoing description and from a study of the drawing, that fluid motors constructed along the lines of the present invention will serve to provide smooth and efficient control for the throttle valve of an engine, or any other similar device to be actuated, and that motors of this type may lend themselves to many other control operations not specifically described in the present instance.

While two modifications of the invention have been described and illustrated, it is to be expressly understood that the invention is no way limited thereby, and that various changes and modifications may be made therein without departing from the scope of the invention, for the limits of which reference is had to the appended claims.

What is claimed is:

1. The combination with a source of fluid pressure and a device to be actuated, of a fluid motor having a casing adapted to receive fluid under pressure from said source, a pressure responsive member movably mounted in said casing having a predetermined range of movement and subjected to the pressure therein, a cylinder slidably mounted in said casing and connected for actuation by said pressure responsive member, a piston slidably mounted in said cylinder and having a predetermined range of movement therein, means for connecting said piston with the device to be actuated, and resilient means interposed between the casing and said piston and between the casing and said cylinder for opposing movement thereof in one direction, said resilient means being so proportioned with respect to the areas of said pressure responsive member and piston as to permit the piston and member to each travel through equal portions of their respective ranges in response to a predetermined increase in the pressure of fluid supplied to said fluid motor.

2. The combination with a source of fluid pressure and a device to be actuated, of a fluid motor having a casing adapted to receive fluid under pressure from said source, a pair of interconnected relatively movable pressure responsive members mounted in said casing each having a predetermined range of movement and subjected to the pressure from the source, a connection between one of said pressure responsive members and the device to be actuated, and resilient means interposed between the casing and each of said members for opposing movement thereof in one direction, said resilient means being so proportioned with respect to the areas of said members as to permit said members to travel through substantially equal portions of their respective ranges in response to a predetermined increase in the pressure of fluid supplied to said casing.

3. The combination with a source of fluid pressure and a device to be actuated, of a fluid motor having a casing, a pressure responsive member movably mounted therein and subjected to the pressure from the source, a cylinder carried by said pressure responsive member, a piston slidably mounted in said cylinder and having a frictional connection therewith, means for operatively connecting said piston and device, resilient means interposed between the casing and piston for opposing movement of the latter in one direction, and resilient means interposed between said casing and cylinder for limiting the movement of the cylinder to an amount less than that of the piston.

4. The combination with a source of fluid pressure and a device to be actuated, of a fluid motor for actuating said device including a casing having a cylinder adapted to receive pressure from said source, a piston slidably mounted in said cylinder and having a connection with said device and resilient means for opposing the movement of said piston in one direction, and means for moving said cylinder in the direction of movement of said piston in response to the application of fluid pressure thereto, including a pressure responsive member subjected to the pressure from said source and resilient means interposed between said casing and pressure responsive member for limiting the degree of movement thereof in response to the action of a predetermined degree of pressure thereon to an amount less than the corresponding movement of said piston.

5. A fluid pressure motor comprising a casing having a pair of interconnected pressure responsive members mounted therein each having a predetermined range of movement, means for subjecting both said members to fluid pressure for effecting movement thereof in one direction, means for connecting one of said members with a device to be actuated, and resilient means interposed between the casing and each of said members for opposing movement thereof in said one direction, said resilient means being so proportioned with respect to the areas of said members as to permit said members to travel through substantially equal portions of their respective ranges when the members are subjected to a predetermined fluid pressure.

6. The combination with a source of fluid pressure and a device to be actuated, of a fluid motor having a casing, a cylinder formed in said casing and adapted to receive fluid under pressure from said source, a piston slidably mounted in said cylinder having a predetermined range of movement and subjected to the pressure of fluid therein, a pressure responsive member carried by said piston having a predetermined range of movement relative to the piston and subjected to the pressure in said cylinder, an operative connection between said pressure responsive member and device, and means including resilient means interposed between the casing and said piston and between the casing and said pressure responsive member for restraining the movements of said piston and member to substantially equal portions of their respective ranges when fluid at a predetermined pressure is supplied to said cylinder.

7. The combination with a source of fluid pressure and a device to be operated, of the fluid motor having a casing, a pressure responsive member movably mounted therein and subjected to pressure from said source, a fluid pressure actuator mounted in said casing having an element operatively connected with said device and a second element movable relatively thereto and connected with said pressure responsive member, means for supplying fluid pressure from said source to said member and fluid pressure actuator, and resilient means interposed between said member and casing and between said fluid actuator element and casing for controlling the relative position of said element and member and permitting differential movement thereof on application of fluid pressure thereto and for causing the degree of movement of said elements to be proportional at all times to the pressure supplied thereto throughout the range of pressures supplied to said fluid motor.

8. The combination with a source of fluid pressure and a device to be actuated, of a fluid motor having a casing, a pair of inter-connected relatively movable pressure responsive members mounted therein, means for connecting one of said members with the device to be actuated, means for subjecting both said members to equal increments of pressure from said source, and resilient means associated with each member and the casing for rendering the travel of each member different from the other and proportional to said increments of pressure applied thereto throughout the range of pressures supplied to said fluid motor.

9. The combination with a source of fluid pressure and a device to be operated, of a fluid motor having a casing, a fluid actuator including a pair of relatively movable pressure responsive members mounted for movement therein through a predetermined range, means for connecting one of said relatively movable pressure responsive members with the device to be actuated, means including a third pressure responsive member movable through a predetermined range for moving the other of said first named pressure responsive members, means for subjecting all said pressure responsive members to equal increments of pressure from said source, and resilient means interposed between the casing and two of said pressure responsive members for restraining the movements of said last named members in response to said pressure increments to substantially equal portions of their respective ranges of movement.

10. A fluid pressure motor comprising a casing having a pair of interconnected fluid pressure responsive members mounted for movement therein through predetermined ranges of movement, means for subjecting both said members to the pressure of the fluid for effecting movement thereof in one direction, means for connecting one of said members with a device to be actuated, and resilient means interposed between said casing and members for opposing movement thereof in one direction and for permitting differential movement of said members, the movements of said members being proportional to the pressure of fluid supplied thereto and representing substantially equal portions of their respective ranges.

11. A fluid actuator including a casing having a pair of interconnected fluid pressure responsive members mounted for movement therein, one of said members having a predetermined range of movement relative to the casing and the other member having a predetermined range of movement relative to said one member, means for connecting one of said members with a device to be operated, and resilient means interposed between the casing and each of said members for insuring movement of said members through substantially equal portions of their respective ranges when said members are subjected to equal changes of fluid pressure.

WILFRED A. EATON.